United States Patent
Hajiaghajani et al.

(10) Patent No.: US 7,763,087 B2
(45) Date of Patent: Jul. 27, 2010

(54) SAFETY SYSTEM ARCHITECTURE FOR A HYDROGEN FUELING STATION

(75) Inventors: Masoud Hajiaghajani, Houston, TX (US); Vesna R. Mirkovic, Pearland, TX (US); Hongqiao Sun, Sugar Land, TX (US); W. Spencer Wheat, Missouri City, TX (US); Gregory W. Laframboise, Concord, CA (US); Tonya A. Betts, Houston, TX (US)

(73) Assignee: Texaco Inc., San Ramon, CA (US)

( * ) Notice: Subject to any disclaimer, the term of this patent is extended or adjusted under 35 U.S.C. 154(b) by 865 days.

(21) Appl. No.: 11/015,054

(22) Filed: Dec. 17, 2004

(65) Prior Publication Data

US 2006/0136099 A1 Jun. 22, 2006

(51) Int. Cl.
*C01B 3/36* (2006.01)
*C01B 3/32* (2006.01)
*B01J 7/00* (2006.01)
*B01J 19/00* (2006.01)
*G06F 17/00* (2006.01)

(52) U.S. Cl. ............... 48/197 R; 48/61; 48/198.7; 422/108; 700/272

(58) Field of Classification Search ............... 48/198.7, 48/61, 197 R; 700/272; 429/22, 17, 19–20, 429/30; 422/108
See application file for complete search history.

(56) References Cited

U.S. PATENT DOCUMENTS

| | | | |
|---|---|---|---|
| 6,383,670 B1 * | 5/2002 | Edlund et al. ............... 429/20 |
| 2002/0034669 A1 * | 3/2002 | Kobayashi et al. ............ 429/25 |
| 2002/0114984 A1 * | 8/2002 | Edlund et al. ............... 429/19 |
| 2003/0024489 A1 * | 2/2003 | Balan et al. .................. 123/3 |
| 2003/0077492 A1 * | 4/2003 | Kuriiwa et al. ............... 429/22 |
| 2003/0164202 A1 | 9/2003 | Graham et al. | |
| 2003/0176951 A1 | 9/2003 | DeMarchi et al. | |
| 2004/0163731 A1 | 8/2004 | Eichelberger et al. | |
| 2004/0197238 A1 * | 10/2004 | Mirkovic et al. ............ 422/105 |
| 2004/0197615 A1 | 10/2004 | Mirkovic et al. | |
| 2004/0250472 A1 * | 12/2004 | Okada et al. .............. 48/214 A |
| 2005/0115150 A1 * | 6/2005 | Ukai et al. .................... 48/89 |
| 2006/0024540 A1 * | 2/2006 | LaVen et al. ................ 429/22 |

\* cited by examiner

*Primary Examiner*—Walter D Griffin
*Assistant Examiner*—Natasha Young
(74) *Attorney, Agent, or Firm*—Melissa Patangia; Frank C. Turner; Williams, Morgan & Amerson

(57) ABSTRACT

An apparatus and a method for use in controlling the apparatus are disclosed. The apparatus includes a purified hydrogen generator; at least one of a compression unit, a storage unit, and a dispensing unit; and a system controller. The system controller is capable of monitoring the operation of the hydrogen generator and the compression unit, storage unit, or dispensing unit at a system level and shutting down at least one of hydrogen generator and the compression unit, storage unit, or dispensing unit upon the detection of a dangerous condition. The method includes monitoring the generation of a purified hydrogen stream from a system level; monitoring the at least one of a compression, a storage, and a dispensing of the purified hydrogen gas stream from the system level in concert with monitoring the purified hydrogen gas stream generation; and shutting down at least one of the purified hydrogen gas stream generation and the compression, the storage, or the dispensing upon the detection of a dangerous condition at the system level.

13 Claims, 10 Drawing Sheets

SAFETY SYSTEM ARCHITECTURE FOR A HYDROGEN FUELING STATION

BACKGROUND OF THE INVENTION

1. Field of the Invention

The present invention is directed to a hydrogen fueling station, and, more particularly, to a control system for use in a fuel processor.

2. Description of the Related Art

There are numerous uses for pure hydrogen or hydrogen-enriched gas streams. For instance, fuel cells—a promising alternative energy source—typically employ hydrogen as a fuel for generating power. Many industrial processes also employ hydrogen or hydrogen-enriched gas streams in a variety of fields for the manufacture and production of a wide assortment of end products. However, pure hydrogen is not available as a natural resource in a form that can be readily exploited. As a counter-example, natural gas, a hydrocarbon-based fuel, is frequently found in large subterranean deposits that can be easily accessed and transported once tapped. Nature does not provide such deposits of hydrogen.

One way to overcome this difficulty is the use of "fuel processors" or "reformers" to convert hydrocarbon-based fuels to a hydrogen rich gas stream which can be used as a feed for fuel cells. Hydrocarbon-based fuels, such as natural gas, liquid petroleum gas ("LPG"), gasoline, and diesel, require conversion for use as fuel for most fuel cells. Current art uses multi-step processes combining an initial conversion process with several clean-up processes. The initial process is most often steam reforming ("SR"), autothermal reforming ("ATR"), catalytic partial oxidation ("CPOX"), or non-catalytic partial oxidation ("POX"). The clean-up processes are usually comprised of a combination of desulfurization, high temperature water-gas shift, low temperature water-gas shift, selective CO oxidation, or selective CO methanation. Alternative processes include hydrogen selective membrane reactors and filters.

However, safety issues can arise. Consider a hydrogen fueling station for refueling fuel cell powered vehicles that employs a fuel processor. Fuel processing involves pressures and temperatures that, if not controlled properly, could damage the equipment or create harmful conditions for the operators. Moreover, depending on the nature of the fuel processor, both the reactants reformed and the hydrogen produced can require careful control and handling. The hydrogen produced by a fuel processor is also typically stored under pressure until it can be dispensed, which also needs appropriate controls. Thus, new and better control strategies are desirable.

SUMMARY OF THE INVENTION

The invention comprises, in its various aspects and embodiments, an apparatus and a method for use in controlling the apparatus. The apparatus includes a hydrogen generator; at least one of a compression unit, a storage unit, and a dispensing unit; and a system controller. The system controller is capable of monitoring the operation of the hydrogen generator and the compression unit, storage unit, or dispensing unit at a system level and shutting down at least one of hydrogen generator and the compression unit, storage unit, or dispensing unit upon the detection of a dangerous condition. The method includes monitoring the generation of a hydrogen stream from a system level; monitoring the at least one of a compression, a storage, and a dispensing of the hydrogen gas stream from the system level in concert with monitoring the hydrogen gas stream generation; and shutting down at least one of the hydrogen gas stream generation and the compression, the storage, or the dispensing upon the detection of a dangerous condition at the system level.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
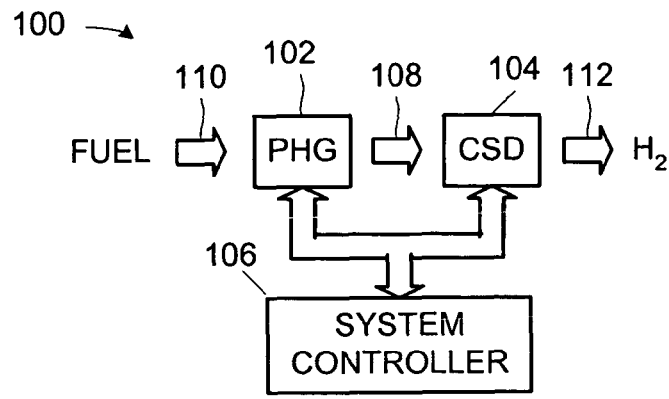
FIG. 1 is a block diagram of one particular embodiment of an apparatus, a hydrogen fueling station in the illustrated embodiment, constructed and operated in accordance with the present invention.

FIG. 1 illustrates one particular embodiment of an apparatus 100 constructed and operated in accordance with the present invention. The apparatus 100 functions as a hydrogen fueling station. The apparatus 100 comprises a hydrogen generator, e.g., a purified hydrogen generator ("PHG"), 102, a compression, storage, and dispensing unit ("CSD") 104, and a system controller 106. The PHG 102 produces a purified hydrogen gas stream 108 from a fuel 110. Note that the term "purified" does not necessarily imply that the pure hydrogen gas stream 108 is 100% hydrogen. As those in the art having the benefit of this disclosure will appreciate, the purified gas stream 108 will contain some minimal amount of impurities. The amount will be implementation specific. In the illustrated embodiment, the purified hydrogen gas stream 108 is equal to or greater than about 99.8% hydrogen. As the name implies, the CSD 104 compresses the purified hydrogen gas stream 108, stores it, and then dispenses it on demand. The dispensed hydrogen 112 can then be used to, e.g., refuel vehicles powered by fuel cells. However, the dispensed hydrogen 112 may be used for other purposes.

Figure 2:
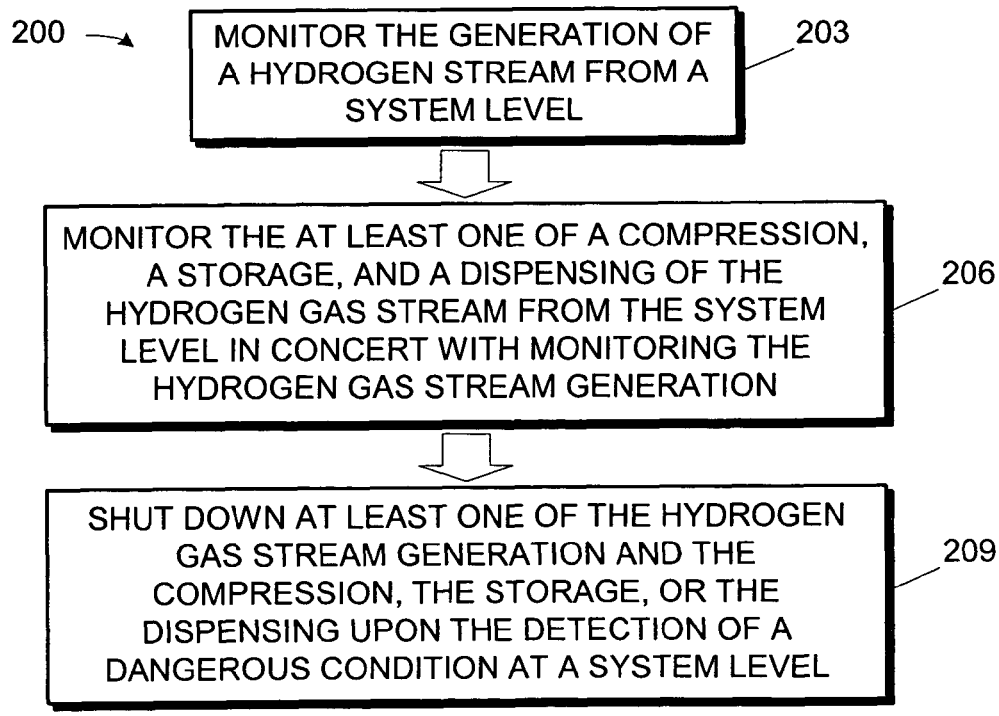
FIG. 2 illustrates one particular embodiment of a method practiced in accordance with the present invention as a part of the operation of the apparatus of FIG. 1.

The system controller 106 is capable of monitoring the operation of the PHG 102 and the CSD 104 and shutting down at least one of them upon the detection of a dangerous condition. More particularly, the system controller 106 performs the method 200, shown in FIG. 2. The system controller 106 monitors (at 203) the generation of a purified hydrogen stream 108 from a system level. The system controller 106 also monitors (at 206) at least one of a compression, a storage, and a dispensing of the purified hydrogen gas stream 108 from the system level in concert with monitoring the purified hydrogen gas stream generation. In the illustrated embodiment, the system controller 106 actually monitors all three of the compression, storage, and dispensing. The system controller 106 then shuts down (at 209) at least one of the purified hydrogen gas stream generation and the compression, the storage, or the dispensing upon the detection of a dangerous condition at the system level.

Figure 3:
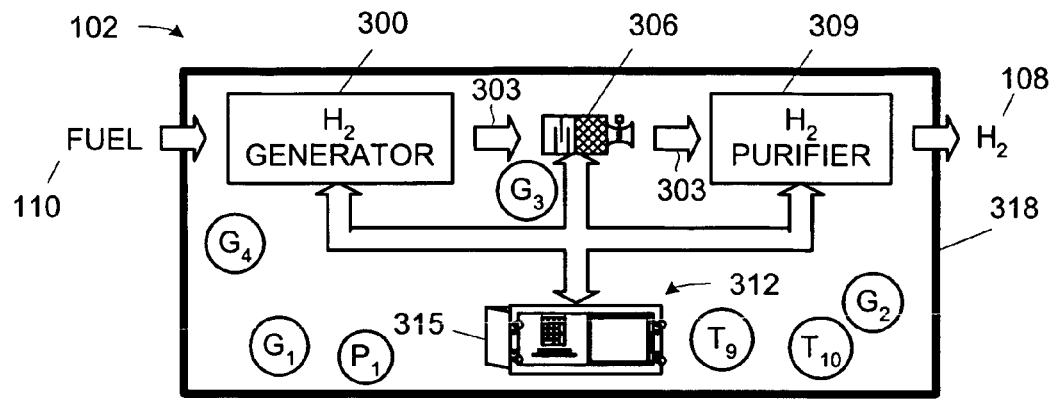
FIG. 3 is a block diagram of one embodiment of the purified hydrogen generator of the apparatus of FIG. 1.
Figure 4:
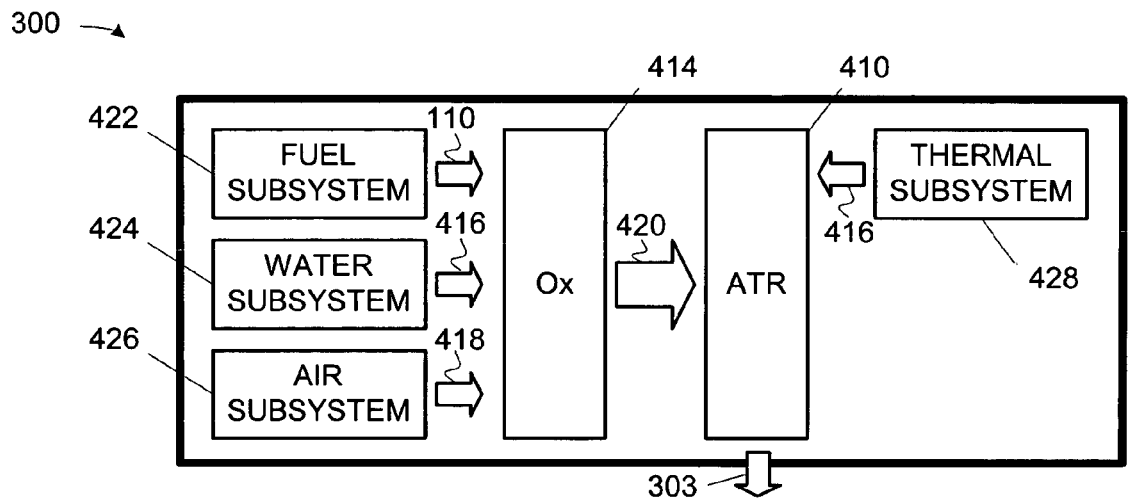
FIG. 4 is a block diagram of one particular embodiment of the fuel processor of the purified hydrogen generator in FIG. 3.
Figure 5:
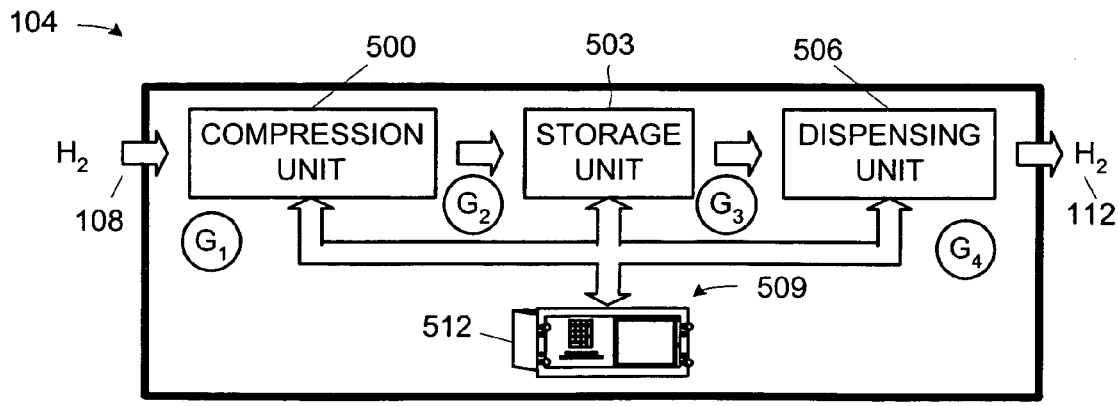
FIG. 5 is a block diagram of one particular embodiment of the compression, storage, and dispensing unit of FIG. 1.

To further an understanding of the present invention, and to illuminate various aspect of the present invention that may be practiced in alternative embodiments, additional details on the construction and operation of the apparatus 100 will now be presented. The construction of the PHG 102 is illustrated in FIG. 3-FIG. 4. FIG. 5 depicts an implementation of the CSD 104. FIG. 6-FIG. 11 illustrate a control technique for the hydrogen generator 300.

FIG. 3 depicts one particular embodiment of the PHG 102 of the apparatus 100 in FIG. 1. The PHG 102 includes a hydrogen generator 300 fed the fuel 110. The hydrogen generator 300 reforms the fuel 110 to produce a reformate 303, which is a hydrogen enriched gas stream. In the illustrated embodiment, the reformate 303 is 40% hydrogen. The hydrogen generator 300 is, in the illustrated embodiment, a fuel processor. A compressor 306 compresses the reformate 303 and provides it at a predetermined pressure to a hydrogen purifier 309. The hydrogen purifier 309 is, in this particular embodiment, a pressure swing adsorption ("PSA") unit. The hydrogen generator 300, the compressor 306, and the hydrogen purifier 309 operate under the direction of a local, automated control system 312, represented by a computing apparatus 315.

The design of the hydrogen generator 300, and the reforming process it implements, will depend to a large degree on the fuel 110 input to the hydrogen generator 300 and the end use to which the reformate 303, once purified, will be put. The fuel in the illustrated embodiment is natural gas, but may be some other type of hydrocarbon. The fuel 110 may be liquid or gas at ambient conditions as long as it can be vaporized. As used herein the term "hydrocarbon" includes organic compounds having C—H bonds capable of producing hydrogen from a partial oxidation or steam reforming reaction. The presence of atoms other than carbon and hydrogen in the molecular structure of the compound is not excluded. Thus, suitable fuels include, but are not limited to hydrocarbon fuels such as natural gas, methane, ethane, propane, butane, naphtha, gasoline, and diesel fuel, and alcohols such as methanol, ethanol, propanol, and the like.

The design of the hydrogen generator 300 will be a function of a number of factors, including the fuel 110 to be used and the composition of the reformate 303. As mentioned above, the hydrogen generator 300 of the illustrated embodiment is a fuel processor. Fuel processors are well known to the art and any suitable fuel processor design known to the art may be used to implement the hydrogen generator 300. One such design is discussed more fully below relative to FIG. 4. Note, however, that technologies other than fuel processing are known by which the fuel 110 may be converted to a hydrogen rich gas stream. One such exemplary, alternative technology is an electrolyzer. Thus, the hydrogen generator 300 is but one example of a means by which the fuel 110 may be reformed and other means may be employed in alternative technologies.

Similarly, the design of the hydrogen purifier 309 will be function of factors such as the composition of the reformate 303 and the requirements, such as output pressure and purity, for the output purified hydrogen 108. The compressor 306 is selected to accommodate the output pressure of the hydrogen generator 303 and the input pressure of the hydrogen purifier 309. Also as mentioned above, the hydrogen purifier 309 of the illustrated embodiment is a PSA unit. PSA units are well known to the art and any suitable PSA unit design known to the art may be used to implement the hydrogen purifier 309. Note, however, that technologies other than pressure swing adsorption are known by which the reformate 303 may be purified. One such exemplary, alternative technology is to use hydrogen-selective membranes such as are known in the fuel processing art for separating hydrogen from impurities in a hydrogen rich stream. Thus, the hydrogen purifier 309 is but one example of a means by which the reformate 303 may be purified and other means may be employed in alternative technologies.

As previously mentioned, the hydrogen generator 300 provides a hydrogen-rich effluent stream, or "reformate," as indicated by the graphic 303 to the hydrogen purifier 309. The reformate 303, in the illustrated embodiment, includes hydrogen and carbon dioxide and can also include some water, unconverted hydrocarbons, carbon monoxide, impurities (e.g., hydrogen sulfide and ammonia) and inert components (e.g., nitrogen and argon, especially if air was a component of the feed stream). Note, however, that the precise composition of the reformate 303 is implementation specific and not material to the practice of the invention.

FIG. 4 illustrates one particular embodiment of the hydrogen generator 300 of the illustrated embodiment. The hydrogen generator 300 is, in the illustrated embodiment, a "fuel processor," or "reformer," i.e., an apparatus for converting hydrocarbon fuel into a hydrogen rich gas. The term "fuel processor" shall be used herein. In the embodiment illustrated herein, the hydrogen generator 300 is a compact processor for producing a hydrogen rich gas stream from a hydrocarbon fuel. However, other fuel processors may be used in alternative embodiments. The hydrogen generator 300 comprises several modular physical subsystems, namely:

- an autothermal reformer ("ATR") 410 that performs the oxidation-reduction reaction that reforms the fuel 110 into the reformate 303;
- an oxidizer ("Ox") 414, which is an anode tailgas oxidizer ("ATO") in the illustrated embodiment, that preheats water 416, fuel 110, and air 418 for delivering a heated fuel mixture, or "process feed stream," 420 delivered to the ATR 410;
- a fuel subsystem 422, that delivers an input fuel 110 to the oxidizer 414 for preheating and inclusion in the process feed stream 420 delivered to the ATR 410;
- a water subsystem 424, that delivers the water 416 to the oxidizer 414 for conversion to steam and inclusion in the process feed stream 420 delivered to the ATR 410;
- an air subsystem 426, that delivers air 418 to the oxidizer 414 for inclusion in the process feed stream 420 delivered to the ATR 410; and
- a thermal subsystem 428, that controls temperatures in the operation of the ATR 410 by circulating a water 416 therethrough.

Particular embodiments of these subsystems are disclosed more fully below relative to FIG. 12A-FIG. 12F. The fuel subsystem 422, water subsystem 424, air subsystem 425, and thermal subsystem 428 may be implemented in any manner known to the art suitable for achieving the operational characteristics of the oxidizer 414 and ATR 410.

In some embodiments, the water gas shift of the ATR 210 employs non-pyrophoric shift catalyst(s), not shown. Non-pyrophoric shift catalysts are those that typically do not increase in temperature more than 200° C. when exposed to air after initial reduction. Non-pyrophoric shift catalysts may be based on precious metals, e.g., platinum or non-precious metals, e.g., copper. A commercially available non-pyrophoric shift catalyst suitable for use with the present invention is the SELECTRA SHIFT™ available from Engelhard Corporation, Iselin, N.J. However, other suitable non-pyrophoric shift catalysts may be used.

During reforming operations of ATR 210, reformate and optionally additional steam are directed through the shift catalyst bed. Care should be taken to assure that liquid water does enter the shift bed as liquid water will coat and potentially degrade the catalyst. The shift reaction temperature is maintained at a temperature below about 300° C. The shift catalyst can withstand transient temperatures that exceed such temperatures for short periods of time of less than about 60 minutes, preferably less than about 45 minutes, and more preferably less than about 30 minutes. However, even during such transient periods, the reaction temperature should be less than about 400° C., preferably less than about 375° C. and more preferably less than about 350° C. Should the shift catalyst be subjected to over-temperature conditions for an extended period of time, the activity of the catalyst can irreversibly change to favor a methanation reaction.

The shift catalyst requires regeneration in order to maintain its activity. Regeneration of the shift catalyst can be achieved through oxidation. Specifically, the flow of steam to the reformer and to the shift catalyst bed is interrupted so that only air flows through the shift bed. After the reactor has been purged, oxidation of the shift catalyst bed is allowed to proceed. Regeneration of the catalyst bed through oxidation can be allowed to proceed more slowly at lower temperatures, e.g. by maintaining the shift bed at a temperature about 220° C. overnight, or may be driven more quickly at higher temperatures, e.g., by maintaining the shift bed at a temperature up to about 400° C. for about hour or more. During regeneration, care should be taken to ensure that neither liquid water nor steam flow through the shift catalyst bed.

FIG. 5 illustrates one particular embodiment of the CSD 104 of FIG. 1. The CSD unit 104 includes a compression unit 500, a storage unit 503, and a dispensing unit 506. The compression unit 500 receives the purified hydrogen 108 from the PHG 102 for storage in the storage unit 503. The purified hydrogen 108 is stored under pressure until dispensed via the dispensing unit 506. The operation of the CSD 104 is controlled by a local, automated control system 509, represented by the computing apparatus 512. The CSD 104 may be any CSD known to the art.

Both the PHG 102 and the CSD 104 include a local controller—namely, the local control system 312, shown in FIG. 3, and the local control system 509, shown in FIG. 5. These local control systems 312, 509 may use conventional control strategies commonly known to the art. In the illustrated embodiment, the local control system 509 of the CSD 104 does, in fact, employ conventional control strategies. However, the PHG 102 does not.

Figure 6:
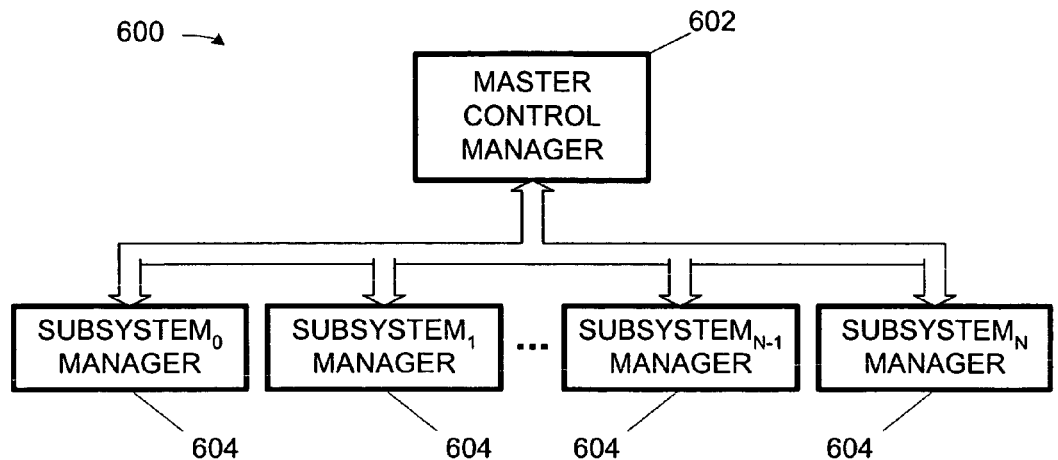
FIG. 6 illustrates one particular embodiment of a control system implemented in accordance with the present invention.

FIG. 6 illustrates one particular embodiment of a control system 600 designed, built, and operated in accordance with the present invention. This particular control system is more fully disclosed in U.S. application Ser. No. 10/407,488, entitled "Architectural Hierarchy of Control for a Fuel Processor," filed Apr. 19, 2003, in the name of the inventors Vesna R. Mirkovic et al., and commonly assigned herewith. Pertinent portions will now be reproduced to further an understanding of selected aspects of the present invention.

The control system 600 comprises a master control manager 602, and a plurality of physical subsystem managers 604. The number of subsystem managers 604 is not material to the invention. Accordingly, FIG. 6 illustrates N subsystem managers 604, designated SUBSYSTEM MANAGER$_0$-SUBSYSTEM MANAGER$_N$. In theory, the number N may be any number, although those skilled in the art having the benefit of this disclosure will appreciate that certain practical limitations will arise from implementation specific details. Nevertheless, the number N of subsystem managers 604 is not material to the practice of the invention.

Figure 7A:
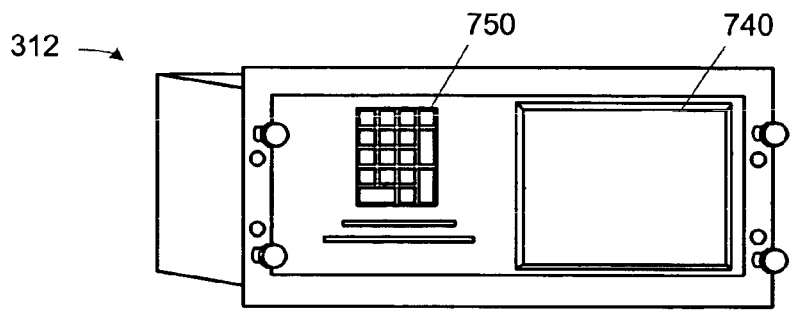
FIG. 7A and FIG. 7B conceptually illustrate a computing apparatus as may be used in the implementation of the embodiment of FIG. 6.
Figure 7B:
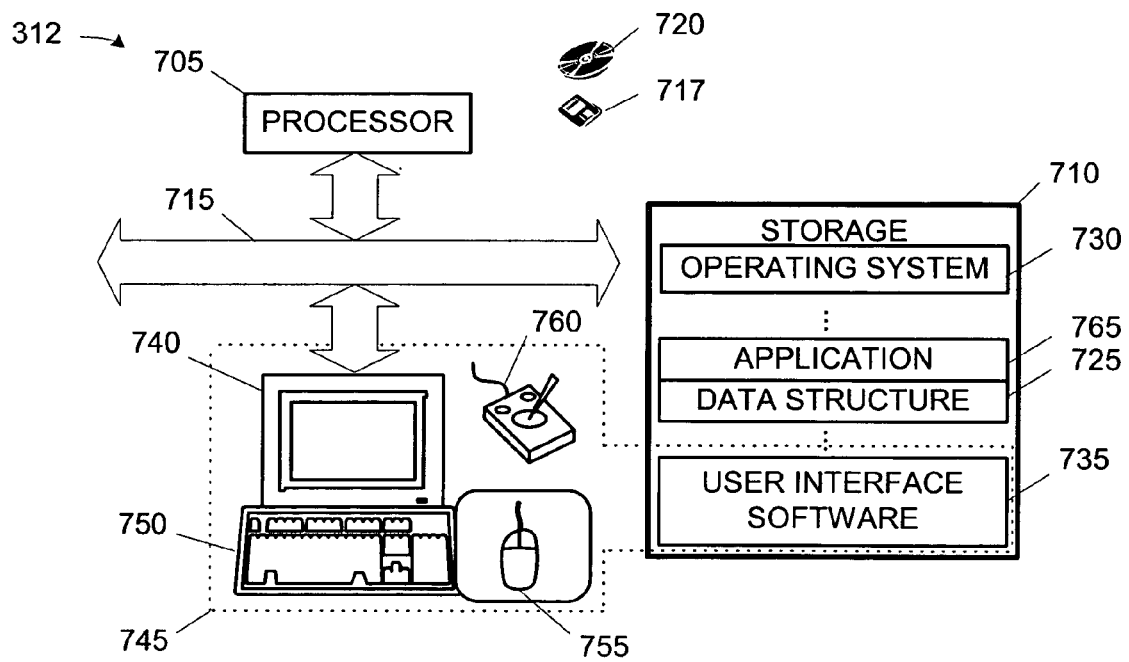

The control system 600 is largely software implemented on a computing apparatus, such as the rack-mounted computing apparatus 312 is illustrated in FIG. 7A and FIG. 7B. Note that the computing apparatus 312 need not be rack-mounted in all embodiments. Indeed, this aspect of any given implementation is not material to the practice of the invention. The computing apparatus 312 may be implemented as a desktop personal computer, a workstation, a notebook or laptop computer, or even an embedded processor.

The computing apparatus 312 illustrated in FIG. 7A and FIG. 7B includes a processor 705 communicating with storage 710 over a bus system 715. The storage 710 may include a hard disk and/or random access memory ("RAM") and/or removable storage such as a floppy magnetic disk 717 and an optical disk 720. The storage 710 is encoded with a data structure 725 storing the data set acquired as discussed above, an operating system 730, user interface software 735, and an application 765. The user interface software 735, in conjunction with a display 740, implements a user interface 745. The user interface 745 may include peripheral I/O devices such as a key pad or keyboard 750, a mouse 755, or a joystick 760. The processor 705 runs under the control of the operating system 730, which may be practically any operating system known to the art. The application 765 is invoked by the operating system 730 upon power up, reset, or both, depending on the implementation of the operating system 730. In the illustrated embodiment, the application 765 includes the control system 600 illustrated in FIG. 6.

Thus, at least some aspects of the present invention will typically be implemented as software on an appropriately programmed computing device, e.g., the computing apparatus 312 in FIG. 7A and FIG. 7B. The instructions may be encoded on, for example, the storage 710, the floppy disk 717, and/or the optical disk 720. The present invention therefore includes, in one aspect, a computing apparatus programmed to perform the method of the invention. In another aspect, the invention includes a program storage device encoded with instructions that, when executed by a computing apparatus, perform the method of the invention.

Figure 8:
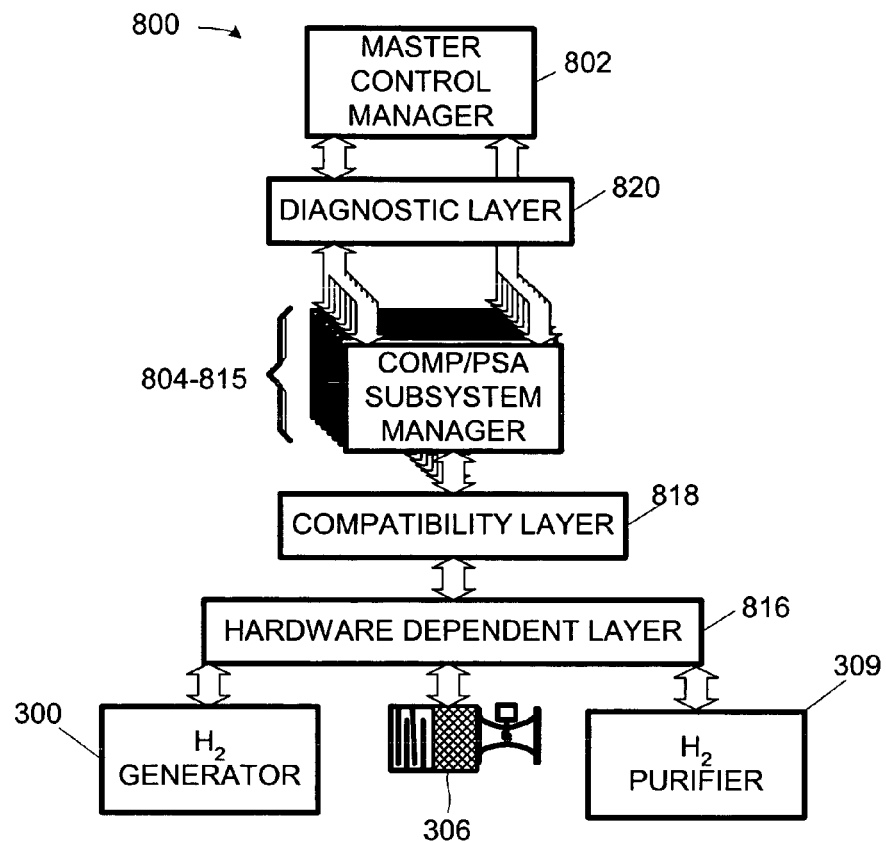
FIG. 8 depicts one particular embodiment of the control system of FIG. 6 for use in locally controlling the fuel processor first shown in FIG. 3.

Returning now to FIG. 4, in the illustrated embodiment, each of the ATR 410, oxidizer 414, fuel subsystem 422, water subsystem 424, air subsystem 426, and thermal subsystem 428 constitutes a physical subsystem controlled by one of the subsystem managers 604. Thus, one particular implementation of the control system 600 for use with the particular hydrogen generator 300 in FIG. 4 is shown in FIG. 8 comprises:

- a master control manager 802 that manages the control of the hydrogen generator 300 through the subsystem managers:
  - a fuel subsystem manager 804 that controls the delivery of fuel to the ATO 414 for mixing into the process feed stream delivered to the ATR 410;
  - a water subsystem manager 806 that controls delivery of water to the ATO 414 for mixing into the process feed stream delivered to the ATR 410;
  - an air subsystem manager 808 that controls delivery of air to the ATO 414 for mixing into the process feed stream delivered to the ATR 410;
  - an ATO subsystem manager 810 that controls the mixing of steam, fuel, and air to create a fuel mixture delivered as a process feed stream to the ATR 410;
  - an ATR subsystem manager 812 that controls the oxidation-reduction reaction in the ATR 410 that reforms the fuel 110 input to the hydrogen generator 300 into a reformate 303;
  - a thermal subsystem manager 814 that controls temperatures in the operation of the ATR 410 through the thermal subsystem 428.
  - a compressory PSA subsystem manager 815 that controls the operation of the compressor 306 and the Hydrogen purifier 309.

Thus, each of the subsystem managers 804-814 controls the operation of a respective physical subsystem 410, 414, 422, 424, 426 and 428.

The control system 800 further includes additional layers that contribute to its modularity in a hierarchical fashion. More particularly, the control system 800 includes a hardware-dependent layer 816 and a "compatibility" layer 818. Aspects of the control functionality that are hardware-dependent are segregated into the hardware-dependent layer 816. For example, referring to FIG. 4, to increase the flow of fuel 110 to the oxidizer 414, one or more control valves are opened. A control signal (not shown) is transmitted from the control system 800 to the actuator (also not shown) of the control valve(s), and the characteristics of this signal are hardware dependent. The functionality of actually generating and transmitting this control signal is segregated into the hardware-dependent layer 816. Thus, if the hardware in, for example, the fuel subsystem 422 is changed out from one model to another, then only the hardware-dependent layer 816 needs to be amended.

The compatibility layer 818 converts instructions issued by the subsystem managers 804-815 so that they are compatible with the hardware of the hydrogen generator 300. For instance, one subsystem manager 804-815 may request an event using a particular unit of measurement. The hardware needed to implement the request may take instructions in a second unit of measurement. The compatibility layer 818 will translate the instruction issued by the subsystem managers 804-815 in the first unit of measurement to the second unit of measurement employed by the hardware so it can be implemented by the hardware-dependent layer 816.

The illustrated embodiment of the control system 800 furthermore includes a diagnostic layer 820 that also contributes to its modularity in a hierarchical fashion. Each of the subsystem managers 804-815 monitors its respective physical subsystem 410, 414, 422, 424, 426, and 428 for error conditions. More particularly, the subsystem managers 804-815 monitor for "shutdown" conditions, i.e., error conditions sufficiently important they warrant shutting down the hydrogen generator 300. The error conditions detected by the subsystem managers 804-815 are reported to the master control manager 802 through the diagnostic layer 820.

Figure 9:
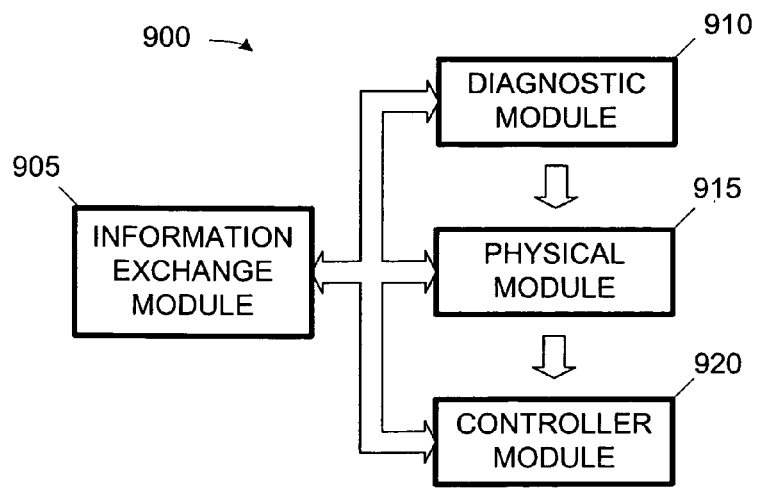
FIG. 9 illustrates an architectural hierarchy of a subsystem manager for the control system first shown in FIG. 8 in accordance with the present invention.

Each of the subsystem managers 804-815 also embodies a modular internal structure 900 conceptually illustrated in FIG. 9. Each of the subsystem managers 804-815 employs this modular internal structure 900 to conduct its management of the respective physical subsystem 410, 414, 422, 424, 426, 428, 300, 306 and 309. Each of the subsystem managers 804-815 includes:

- an information exchange module 905 through which the particular subsystem manager 804-815 determines the feasibility of implementing events requested by other subsystem managers 804-815 through the master control manager 802 and identifies the actions for implementing requested events;
- a diagnostic module 910 that communicates with the diagnostic layer 820 through the information exchange module 905 to report error conditions;
- a physical module 915 with which the information exchange module 905 consults to identify the actions for implementing requested events and with which the diagnostic module communicates to obtain information regarding error conditions; and
- a control module 920 with which the physical module 915 consults to determine which actions are to be taken to implement a requested event and through which communicates with the hardware-dependent layer 816 through the compatibility layer 818 to obtain the information for such determination.

In alternative embodiments of the control system 800 omitting the diagnostic layer 820, the diagnostic module 910 may be omitted from the subsystem managers 804-815.

Returning to FIG. 8, in the illustrated embodiment, the subsystem managers 804-815 cooperate with each other by communicating requests from their information exchange modules 905 through the master control manager 802. For instance, consider a situation in which the oxidizer 414, first shown in FIG. 4, senses a drop in pressure in the feed from the fuel subsystem 422, also first shown in FIG. 4. The ATO subsystem manager 810 may request that the supply of fuel increase. In the parlance of the illustrated embodiment, a fuel increase would be an "event." The ATO subsystem manager 810 issues the request through its information exchange module 905, shown in FIG. 9, which communicates the request to the master control manager 802. The master control manager 802 forwards the request to the appropriate physical subsystem manager—the fuel subsystem manager 804, in this case.

The fuel subsystem manager 804 receives the request via its own information exchange module 905, which checks to see if it is in the proper operational state (discussed further below) to implement the request. The fuel subsystem manager 804 then implements the requested event if it is permissible and feasible. The information exchange module 905 instructs the physical module 915 to implement the requested event. The information exchange module 905 queries the controller module 920 about which actions need to be taken. The information exchange module 905 then informs the physical module 915 of those actions that need to be taken. The physical module 915 then issues such an instruction to the hardware actuator (not shown) through the hardware dependent layer 816 via the compatibility layer 818.

The subsystem managers 804-815 can use conventional control strategies to control the startup and operation their respective subsystems. However, in the illustrated embodiment, the ATR subsystem manager 812 employs a combinatorial control strategy to control the shift reaction temperature. This control strategy is more fully disclosed in U.S. application Ser. No. 11/015,992, entitled "Combinatorial Control Strategy for Fuel Processor Reactor Shift Temperature Control," filed on an even date herewith in the name of the inventors Hongqiao Sun, et al., and commonly assigned herewith. Pertinent portions will now be reproduced.

Figure 12A:
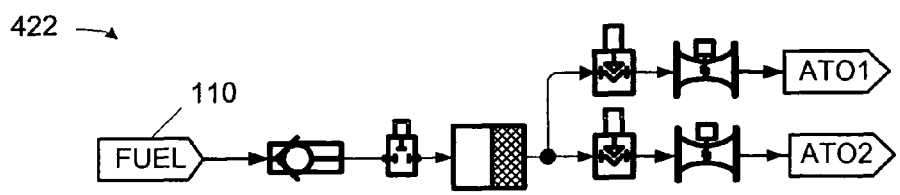
FIG. 12A-FIG. 12F provide additional detail on the structure of the hydrogen generator of FIG. 4 and, in particular, approximations of the locations for the parameters of its operation being directly monitored from a system level.
Figure 12B:
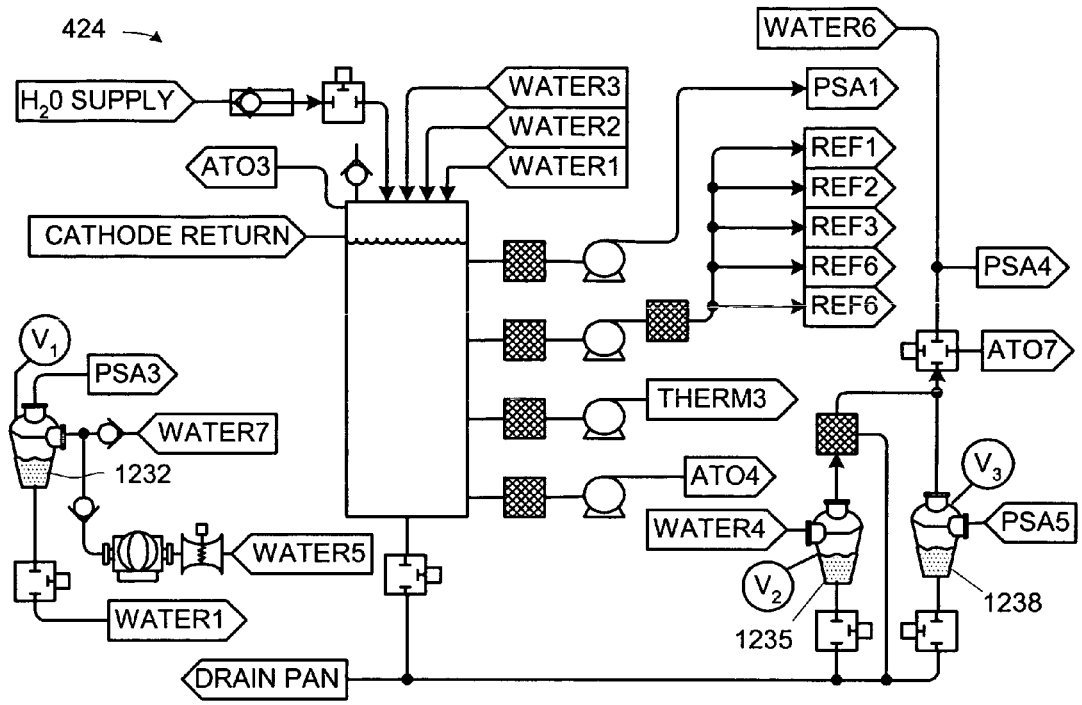
Figure 12C:
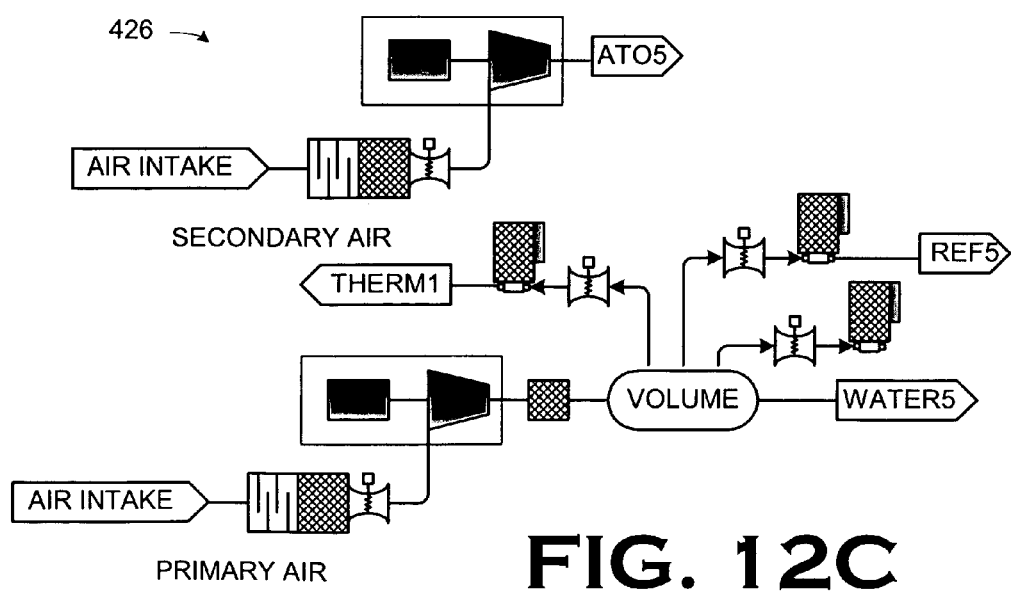
Figure 12D:
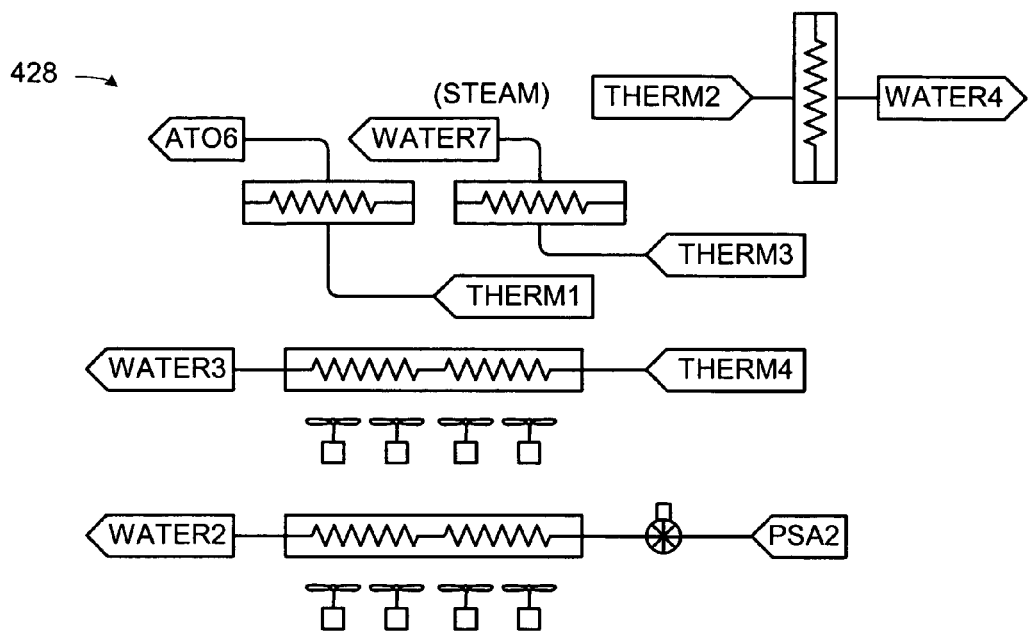
Figure 12E:
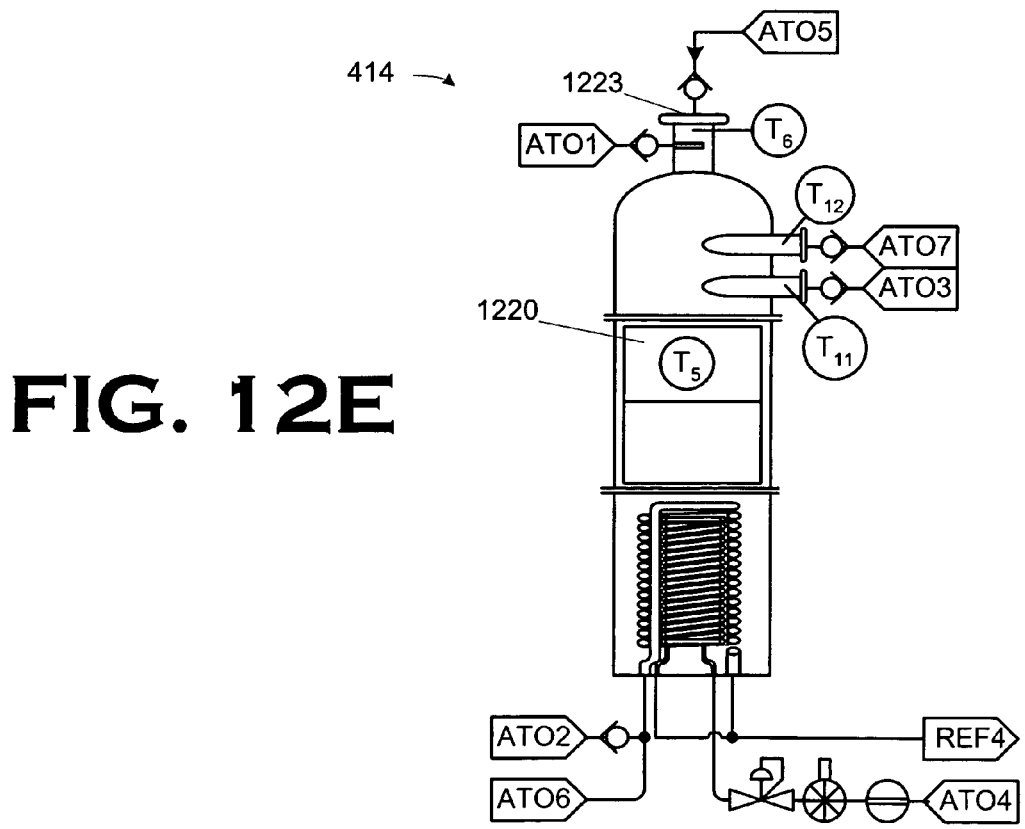
Figure 12F:
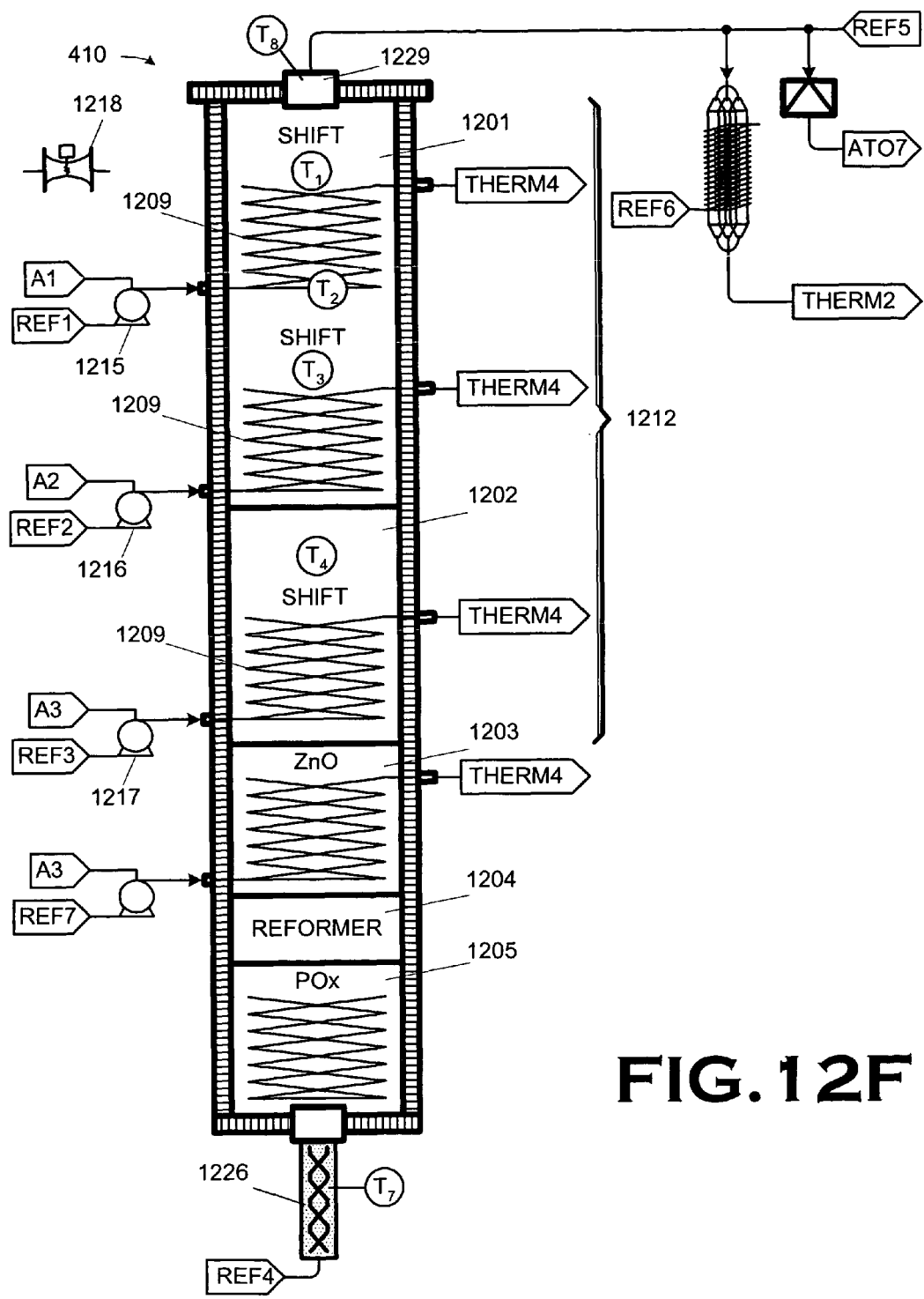

FIG. 12F conceptually depicts one particular implementation of the ATR 410. The ATR 410 may be implemented with any suitable design known to the art. The illustrated ATR 410 comprises several stages 1201-1205, including several heat exchangers 1209 and electric heaters (not shown). The reformer shift bed 1212, i.e., the sections 1201-1202, is functioning to perform the water gas shift reaction which reduces CO concentration and increases $H_2$ production rate.

Each of the heat exchangers 1209 receives temperature controlled coolant (not shown) from the thermal subsystem 428, shown in FIG. 4, over the lines $REF_1$-$REF_3$, respectively, and returns it over the lines $THERM_4$-$THERM_4$, respectively. The flow rate for the coolant in each line is controlled by a respective variable speed (i.e., positive displacement) pump 1215-1217. The pumps 1215-1217 are controlled by the automated control system 312, shown in FIG. 3, by signals received over the lines $A_1$-$A_4$, respectively. In alternative embodiments, a single pump may supply coolant under pressure over the lines $REF_1$-$REF_4$ and the flow rate may be controlled by flow control valves such as the flow control valve 1218. Those in the art having the benefit of this disclosure will appreciate that this figure is simplified by the omission of some elements not pertinent to the present discussion. For example, the heat exchangers mentioned above and various inputs and outputs to the sections 1203-1205 have been omitted for the sake of clarity and so as not to obscure the control technique under discussion.

The shift bed 1212 also includes a plurality of sensors $T_1$-$T_4$ disposed therein. The precise number of temperature sensors $T_x$ is not material, although a greater number will typically provide a finer degree of control. In the illustrated embodiment, the temperature sensors $T_1$-$T_4$ are thermocouples. The automated control system 312 uses the temperature sensors $T_1$-$T_4$ to monitor actual temperatures at various locations within the shift bed 1212. Temperature detection points are selected based upon the structure of the cooling/heating system and should be selected so that the measured temperatures reflect true reaction temperatures rather than localized temperatures adjacent the heat exchange coils 1209.

Note that the temperature sensors $T_1$ and $T_2$ both measure temperature near the same heat exchanger 1209 in a detail that is implementation specific. That particular heat exchanger 1209 includes only a single coolant input $REF_1$. Most of the temperature sensors $T_1$-$T_4$ measure temperature downstream from a catalyst bed section containing a heat exchanger 1209. $T_1$ is supposed to read the temperature immediately downstream from the uppermost catalyst bed (not shown). However, during installation and shipping the bed can shift and settle so that $T_1$ is measuring an air temperature rather than a bed or reaction temperature. Thus, a second sensor $T_2$ is added to monitor the upper section 1201 of the ATR 410. When $T_1$ and $T_2$ are sensing different temperatures, the control system 106 takes the higher of the two temperatures. Typically, there usually is only a minor difference between the two sensed temperatures.

Preheating and water cooling maintain the temperature in the shift bed 1212 within a desired reaction temperature range. In order to achieve this objective, in an enlarged shift reactor, multiple heat exchange coils 1209 may provide localized temperature control. In the illustrated embodiment, the elongated shift bed 1212 utilizes three different heat exchange coils 1209 for controlling the temperature of the shift bed 1212. The reaction temperature control strategy varies as a combination result of $H_2$ production rate, shift reaction stage, shift bed vertical temperature gradient and the temperature detecting points in a manner described more fully below. A robust shift temperature control loop is developed for the reformer to generate stable and high quality $H_2$ product.

Figure 10:
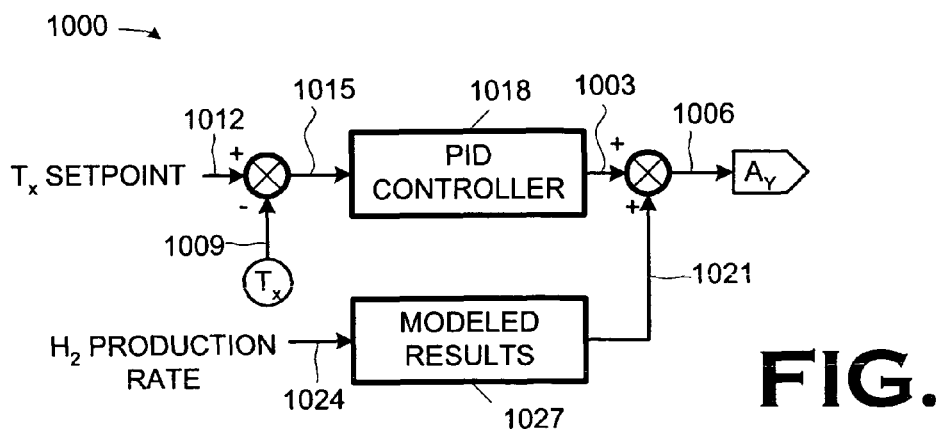
FIG. 10 illustrates a combinatorial strategy for controlling the shift bed temperature of the reformer in FIG. 4.

FIG. 10 conceptually illustrates a control loop 1000 employed by the illustrated embodiment in accordance with the present invention. The settings for each of the variable speed pumps 1215-1217 is controlled by a respective control loop 1000. The control technique employs, in the illustrated embodiment, the complete system modeling effect (the reformer as a whole, including ATR section, ZnO section, shift section, production rate, etc.), develops a dynamic PID control loop to the plant response, and testing data are used to compensate the model offset to improve the robustness of the controller.

More particularly, system modeling takes into account the target hydrogen production rate based upon current flow rates, upstream temperature profiles, reaction stage and shift bed temperature gradient due to heat loss and exothermal reaction effect. A system model for each section of the shift bed can be generated from the reactions and conditions upstream, the geometries of the reactor, the feed to the shift catalyst bed, and the type of shift catalyst that is used, among other factors. Various modeling techniques of this type are known to the art, and any suitable modeling technique may be employed. The system modeling is used to generate set points to be used for the temperature control. These set points include the predicted reformate composition, flow rate and temperature that will be entering a particular shift bed section. Thus, the system modeling generates a group of setpoints for the temperatures measured by the temperature sensors $T_1$-$T_4$. The system modeling also produces a set of results correlating, for example, the temperatures that may be measured by the temperature sensors $T_1$-$T_4$ and the $H_2$ production rate of the ATR 410.

More particularly, the model (not shown) used by the illustrated embodiment was developed using Aspen Plus and Aspen Custom Modeler. These software packages are commercially available from:

Aspen Technology, Inc.
Ten Canal Park
Cambridge, Massachusetts 02141-2201
USA
Phone: +1-617-949-1000
Fax: +1-617-949-1030
email: info@aspentech.com However, other suitable modeling software known to the art may be employed in alternative embodiments.

The model has both steady-state and dynamic capabilities. The performance of the fuel processor 300 is estimated by the model from thermodynamic parameters that result in a desired state at the given temperature and pressure. Reaction conversions and compositions are determined from either kinetic data available in literature for such typical reactions or estimated from models based on experiments conducted in the laboratory for specific reactions. The desired $H_2$ purity and flow rate for the reformate 303 are specified and the model calculates natural gas flow, air flow (calculated back from the optimum $O_2$/C ratio), and water flow (calculated back from the optimum Steam/Carbon ratio).

The resulting temperature of the ATR 410 is calculated as the adiabatic temperature rise resulting from minimizing the free energy of the ATR reaction. The composition of reformate is determined by the model (from thermodynamic and reaction parameter estimations). Using this composition, the model then calculates the desired speed needed for the end use from empirical correlations.

For each of the measured temperatures $T_1$-$T_4$, the ATR subsystem manager 812 determines a first component 1003 for a setting adjustment 1006 for an actuator governing a measured temperature 1009 in a reaction section of a reactor from the measured temperature 1009 and a setpoint 1012 for the measured temperature. The setpoint 1012 is determined as a part of the modeled results discussed above. The measured temperature 1009 is the temperature measured by the temperature sensor $T_x$ at the point of interest in the shift bed 1212, shown in FIG. 12F, at which the temperature sensor $T_x$ is disposed. In the illustrated embodiment, the difference 1015 between the setpoint 1012 and the measured temperature 1009 is input to a proportional-integral-derivative ("PID") controller 1018, such as is known in the art. The output of the PID controller 1018 is the first component 1003.

The ATR subsystem manager 812 also determines a second component 1021 for the setting adjustment 1006 from a $H_2$ production rate 1024 for the fuel processor 102. In the illustrated embodiment, at least selected portions of the modeled results previously discussed are tabulated in a form indexable by the $H_2$ production rate. Thus, the modeled results 1027 may be, for instance, a look-up table wherein various setting adjustments for the actuator are indexed by the $H_2$ production rate to which they correlate. Note that the modeled results 1027 are typically generate a priori by modeling the operation of the hydrogen generator 300 in a variety of operating scenarios to obtain this information. Note also that the determination of the first and second components 1003, 1021 may be performed in parallel or in serial.

The ATR subsystem manager 812 then determines the setting adjustment 1006 from the first and second components 1003, 1021. In the illustrated embodiment, the first and second components 1003, 1021 are summed to obtain the setting adjustment 1006, although alternative embodiments may use more sophisticated techniques for the determination. The setting adjustment 1006 is then signaled to the actuator over the line $A_y$. Note that the setting adjustment 1006 may be 0, i.e., no change is needed because the measured temperature 1009 suitably matches the setpoint 1012. However, at any given time, at least one of, and sometimes all of, the first component 1003, the second component 1021, and the setting adjustment 1006 will be non-zero.

Note that, in some circumstances, the first and second components 1003, 1021 could work in opposite directions with one telling a pump to increase flow and the other telling the pump to decrease flow. Thus, in the illustrated embodiment, the two components 1003, 1021 are not given equal weight in controlling the coolant flow. Specifically, the $H_2$ production rate and the information from the look up table, i.e., the second component 1021, is the dominant component. The first component 1003 that is derived from sensed temperatures 1009 and the setpoints 1012, is used to fine tune the pump speed. By way of example, the second component 1021 might instruct a given pump to operate at 50% of capacity, while the first component focuses on the error and may adjust the pump speed by ±5% of capacity.

Thus, the present invention admits wide variation in the manner in which the local controllers—namely, the local control system 312, shown in FIG. 3, and the local control system 509, shown in FIG. 5—perform their function. The local control system 312, for instance, may employ conventional techniques rather than those disclosed above relative to FIG. 6-FIG. 10. Conversely, the local control system 509 might employ the techniques employed by the local control system 312.

Figure 11:
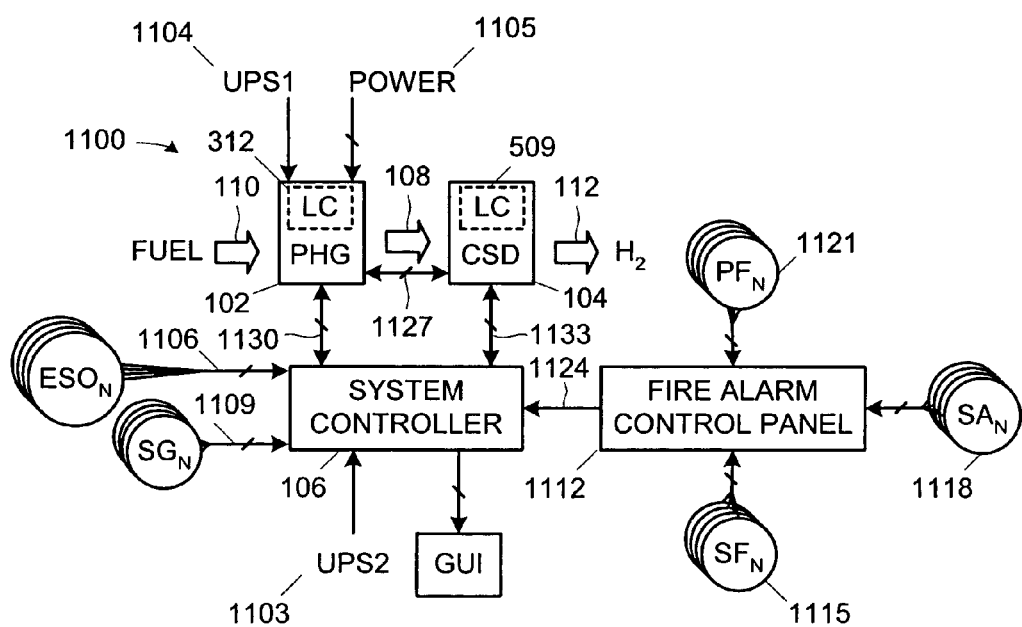
FIG. 11 is a block diagram of one particular embodiment of the apparatus in FIG. 1.

Note, however, that codes imposed by governing legal authorities might warrant modification to the control strategy. Consider the hydrogen fueling station 1100, shown in FIG. 11, which is a variation on the apparatus 100, shown in FIG. 1, with like parts bearing like numbers. FIG. 11 also shows individual signals for the hydrogen fueling station 1100 to provide a more detailed example of how the present invention works in this particular embodiment.

In the illustrated embodiment, the system controller 106 is a programmable logic controller ("PLC") complying with the Class 1, Division 2, Group B National Electrical Code standard. Suitable PLCs are known to the art, such as the SIMATIC series of PLCs commercially available from Siemens AG, Munich, Federal Republic of Germany. The system controller 106 includes a 24V power supply (not shown) and is powered by an uninterruptible power supply ("UPS") 1103, designated as "UPS2", without any fuse of circuit breaker to avoid arcing or sparking in the cabinet 318, shown in FIG. 3, in which it is housed. The PHG 102 is powered by a second UPS 1104, designated "UPS1", and a supply 1105 from a conventional three-phase power grid (not shown).

The system controller 106 also receives a number of other signals related to safety concerns. The hydrogen fueling station 1100 includes a number of emergency shutoff ("ESO", not shown) switches whose outputs 1106 the system controller receives directly. The hydrogen fueling station 1100 also includes a number of gas sensors (not shown) positioned about the site at which it is located. The outputs 1109 of these sensors are also received directly by the system controller 106. The gas sensors may be dedicated to sensing one or both of the natural gas used as the fuel 110 or the hydrogen 108, 110.

The hydrogen fueling station 1100 also includes a separate fire alarm control panel 1112. In addition to the gas sensors, the hydrogen fueling station 1100 includes a plurality of flame sensors and smoke alarms (neither of which are shown)

distributed across the site. The outputs 1115, 1118 of these sensors are output to the fire alarm control panel 1112. In addition, the PHG 102 includes a plurality of flame sensors (not shown) whose outputs 1121 are output directly to the fire alarm control panel 1112. The fire alarm control panel 1112 monitors the outputs 1115, 1118, 1121 and, if smoke or a flame is detected, outputs an alarm over the line 1124 to the system controller 106. The alarm is also sent, in the illustrated embodiment, directly to the local fire department.

The PHG 102 and the CSD 104 directly communicate with each other as indicated by the graphic 1127. The PHG 102 notifies the CSD 104 when it is ready to deliver the purified hydrogen 108. The CSD 104 notifies the PHG 102 when the storage unit 503, shown in FIG. 3, is at minimum capacity and when it is full. In the illustrated embodiment, "minimum capacity" is 30% of the total capacity. Thus, once the PHG 102 is ready, it supplies purified hydrogen 108 to the CSD 104 until the storage unit 503 is full and then stops the supply. When the CSD 104 has dispensed enough of the purified hydrogen 108 such that the storage unit 503 is at less than 30% capacity, it notifies the PHG 102. The PHG 102 then again supplies purified hydrogen 108 until the CSD 104 signals that the storage unit 503 is full.

The PHG 102 and the CSD 104 also communicate bi-directionally with the system controller 106, as indicated by the graphics 1130, 1133, respectively. However, the communications between the PHG 102 and the system controller 106 and the CSD 104 and the system controller 106 differ. The differences arise directly from the different control strategies employed by the system controller 106 with respect to the PHG 102 and the CSD 104.

The system controller 106 communicates directly with the local control system 509, shown in FIG. 5, of the CSD 104. The system controller 106 monitors an output from the CSD 104, awaiting notification of a fault in the CSD 104. If the system controller 106 receives such a notification, then it issues a command to the CSD 104 to shut down. All monitoring of local conditions within the CSD 104 is performed by the local control system 509. The system controller 106 therefore only monitors conditions within the CSD 104 indirectly, i.e., through the filter of the operation of the local control system 509.

Conversely, the system controller 106 monitors the operation of the PHG 102 by monitoring a plurality of parameters sensed within the PHG 102. More particularly, as was discussed above, the local control system 312, shown in FIG. 3, monitors operating conditions within the PHG 102 in the first instance. The local control system 312 performs this monitoring as a part of its control function through the implementation of the hierarchical control architecture 800, shown in FIG. 8. To this end, the PHG 102 includes a number of sensors, such as temperature and pressure sensors (e.g., the temperature sensors $T_1$-$T_4$ in FIG. 10), to monitor local operating conditions. To help illustrate the manner in which these parameters are monitored, particular implementations of the subsystems 410, 414, 422, 424, 426, 428 are illustrated in FIG. 12A-FIG. 12F.

The monitored parameters for the illustrated embodiment are set forth in Table 1. The system controller 106 can obtain the individual parameters through the hierarchical control architecture 800 by, for instance, tapping the hardware dependent layer 816 through a counterpart to the compatibility layer 818. Alternatively, the system controller 106 can receive the outputs of the sensors directly.

TABLE 1

Monitored Parameters

| Parameter Monitored | Reference | Condition Monitored/Associated Action |
|---|---|---|
| Ox 414 Bed 1220, shown in FIG. 12E, Temperature | $T_5$, FIG. 12E | Shutdown PHG 102 on high temperature |
| Ox 414 Inlet 1223, shown in FIG. 12E, Temperature (above electric heater) | $T_6$, FIG. 12E | Shutdown PHG 102 on high temperature |
| Reformer ATR 410 Inlet 1226, shown in FIG. 12F, Temperature | $T_7$, FIG. 12F | Shutdown PHG 102 on high temperature |
| Reformer Shift Temperature | $T_4$, FIG. 12F | Shutdown PHG 102 on high temperature |
| Reformer Outlet 1229, shown in FIG. 12F, Temperature | $T_8$, FIG. 12F | Shutdown PHG 102 on high temperature |
| Flammable Gas Detector - PHG 102 | $G_1$, FIG. 3 | Shutdown PHG 102 on high level |
| Flammable Gas Detector - PHG 102 (above pan, not shown) | G2, FIG. 3 | Shutdown PHG 102 on high level |
| Flammable Gas Detector - PHG 102 (near the compressor 306) | $G_3$, FIG. 3 | Shutdown PHG 102 on high level |
| PHG 102 Electrical Cabinet 318 Differential Pressure | $P_1$, FIG. 3 | Shutdown PHG 102 on electrical cabinet low pressure |
| PHG 102 Hot and Cold Cabinet 318 Differential Pressure | $P_2$, FIG. 3 | Shutdown PHG 102 on the hot and cold cabinets low pressure |
| Compressor 306 Suction Pressure | $P_3$, FIG. 3 | Shutdown PHG 102 on high pressure |
| Compressor 306 2nd Stage Discharge Temperature | $T_1$, FIG. 12B | Close XV-090 and shutdown PSA and reformer compressor |
| Separator 1232 High High Level | $V_1$, FIG. 12B | Shutdown the compressor |

TABLE 1-continued

Monitored Parameters

| Parameter Monitored | Reference | Condition Monitored/Associated Action |
|---|---|---|
| Separator 1235 High High Level | $V_2$, FIG. 12B | Shutdown the compressor |
| Separator 1238 High High Level | $V_3$, FIG. 12B | Shutdown the compressor |
| Digital output to PHG 102 | PHG 102 Shut Down Signal | Output to PHG 102 to communicate that an emergency situation exists and PHG 102 must shutdown. |
| Digital output to CSD 104 | CSD Shut Down Signal | Output to CSD 104 to communicate that an emergency situation exists and CSD 104 must shutdown. |
| Digital input from CSD 104 | CSD Fault Signal | Input from CSD 104 that an emergency exists in the CSD 104 and the rest of the facility must shutdown. |
| Digital signal inputs from the facility ESO buttons | ESO#1-ESO#5 Signal | Manual Emergency Stop Button in the site |
| CO Monitor - Hot Cabinet 318 | $T_{10}$, FIG. 3 | Shutdown PHG 102 on high level |
| CO Monitor | $G_4$, FIG. 3 | Shutdown PHG 102 on high level |
| Fire Alarm Panel | Fire Alarm Signal | Signal indicating that a fire has been detected and that the SIS needs to shutdown the facility. |
| Station Combustible Gas Detectors | $G_1$-$G_4$, FIG. 5 | Detection of any input will cause a PHG 102 shutdown as well as a facility shutdown. |
| ATO 414, shown in FIG. 4 Inlet Temperature - Detection of Flashback | $T_{11}$, FIG. 12E | Shutdown PHG 102 on high temperature |
| ATO 414, shown in FIG. 4, Inlet Temperature | $T_{12}$, FIG. 12E | Shutdown PHG 102 on high temperature |
| UPS1 Under Voltage Relay | UPS1 Fault Signal | Shutdown PHG 102 on Loss of UPS1 Voltage |

Note, however, that the present invention admits variation in this aspect in alternative embodiments. For instance, in some embodiments, the system controller 106 may monitor conditions in both the PHG 102 and the CSD 104 indirectly, i.e., through the filters of the local control systems 312, 509, shown in FIG. 3, FIG. 5, respectively. In other embodiments, the system controller 106 may directly monitor parameters sensed within the PHG 102 and the CSD 104.

Figure 13A:
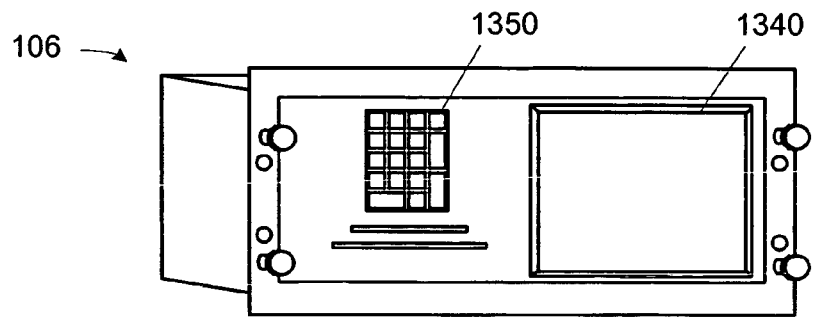
FIG. 13A and FIG. 13B conceptually illustrate a computing apparatus as may be used in the implementation of one particular embodiment of the present invention.
Figure 13B:
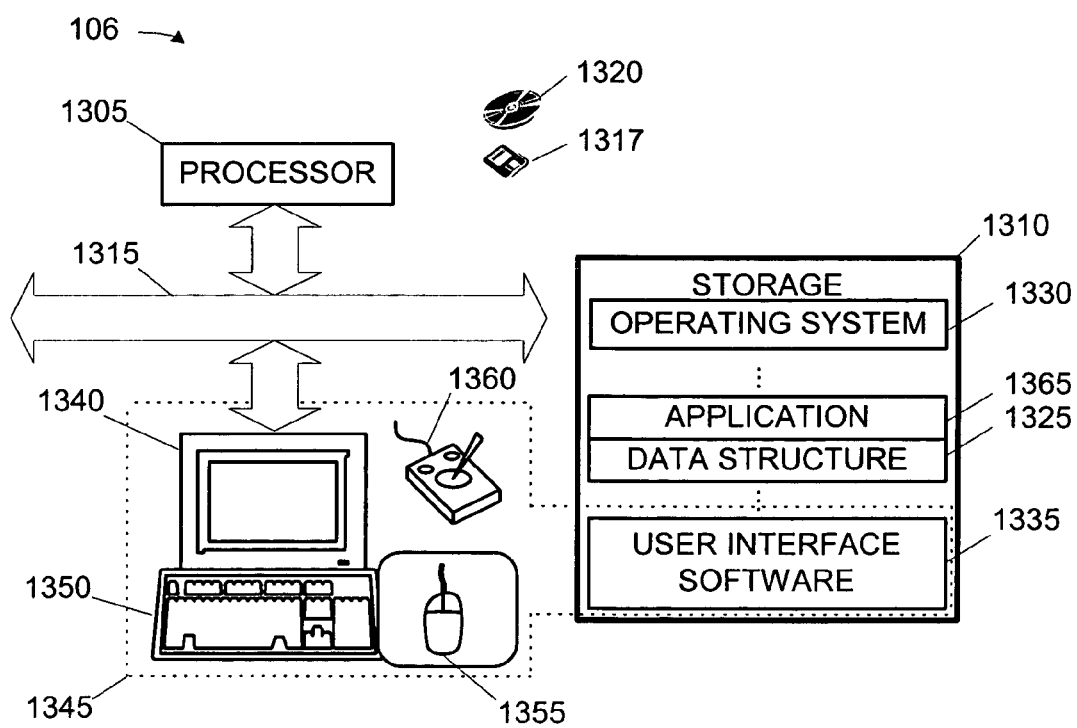

The system controller 106 is implemented in a computing apparatus 1300 illustrated in FIG. 13A and FIG. 13B. The system controller includes a processor 1305 communicating with storage 1310 over a bus system 1315. The storage 1310 may include a hard disk and/or random access memory ("RAM") and/or removable storage such as a floppy magnetic disk 1317 and an optical disk 1320. The storage 1310 is encoded with a data structure 1325 storing the data set acquired as discussed above, an operating system 1330, user interface software 1335, and an application 1365. The user interface software 1335, in conjunction with a display 1340, implements a user interface 1345. The user interface 1345 may include peripheral I/O devices such as a key pad or keyboard 1350, a mouse 1355, or a joystick 1360. The processor 1305 runs under the control of the operating system 1330, which may be practically any operating system known to the art. The application 1365 is invoked by the operating system 1330 upon power up, reset, or both, depending on the implementation of the operating system 1330. In the illustrated embodiment, the application 1365 implements the method 200 illustrated in FIG. 2 and discussed above.

Note that at least some aspects of the present invention will typically be implemented as software on an appropriately programmed computing device, e.g., the computing apparatus 1300 in FIG. 13A and FIG. 13B. The instructions may be encoded on, for example, the storage 1310, the floppy disk 1317, and/or the optical disk 1320. The present invention therefore includes, in one aspect, a computing apparatus programmed to perform the method of the invention. In another aspect, the invention includes a program storage device encoded with instructions that, when executed by a computing apparatus, perform the method of the invention.

Some portions of the detailed descriptions herein may consequently be presented in terms of a software-implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   monitoring the generation of a hydrogen stream from a system level;
   monitoring the at least one of a compression, a storage, and a dispensing of the hydrogen gas stream from the system level in concert with monitoring the hydrogen gas stream generation; and
   shutting down at least one of the hydrogen gas stream generation and the compression, the storage, or the dispensing upon the detection of a dangerous condition at the system level.

2. The method of claim 1, wherein monitoring the generation of a hydrogen stream includes monitoring a hydrogen purifier purifying a hydrogen enriched gas stream.

3. The method of claim 1, wherein monitoring the generation of a hydrogen stream includes monitoring the operation of a fuel processor or an electrolyzer.

4. The method of claim 2, wherein monitoring the hydrogen purifier includes monitoring a pressure swing adsorption unit or a hydrogen-selective membrane.

5. The method of claim 1, further comprising locally monitoring the generation of a hydrogen stream and wherein monitoring the generation of a hydrogen stream at the system level includes monitoring an output from the local monitoring of the hydrogen generation.

6. The method of claim 5, further comprising locally monitoring the at least one of the compression, the storage, and the dispensing of the hydrogen gas stream and wherein monitoring the at least one of the compression, the storage, and the dispensing of the hydrogen gas stream at the system level includes monitoring an output from the local monitoring of the at least one of the compression, the storage, and the dispensing of the hydrogen gas stream.

7. The method of claim 1, further comprising locally monitoring the at least one of the compression, the storage, and the dispensing of the hydrogen gas stream and wherein monitoring the at least one of the compression, the storage, and the dispensing of the hydrogen gas stream at the system level includes monitoring an output from the local monitoring of the at least one of the compression, the storage, and the dispensing of the hydrogen gas stream.

8. The method of claim 1, wherein monitoring the generation of a hydrogen stream from the system level includes monitoring a plurality of parameters sensed within the generation of a hydrogen stream.

9. The method of claim 8, wherein monitoring the at least one of the compression, the storage, or the dispensing of the hydrogen gas stream from the system level includes monitoring a second plurality of parameters sensed within the compression, the storage, and the dispensing of the hydrogen gas stream.

10. The method of claim 1, wherein monitoring the at least one of the compression, the storage, or the dispensing of the hydrogen gas stream from the system level includes monitoring a second plurality of parameters sensed within the compression, the storage, and the dispensing of the hydrogen gas stream.

11. The method of claim 1, further comprising a fire alarm control system capable of monitoring the method for indications of fire and signaling the same to the system controller.

12. The method of claim 1, further comprising monitoring for at least one of interruptions in power supply and emergency shut-off signals at the system level.

13. The method of claim 1, further comprising monitoring for the presence of smoke or flame and signaling the same.

* * * * *